United States Patent Office 3,028,285
Patented Apr. 3, 1962

3,028,285
PLASTIC SURFACE PLYWOOD ARTICLE AND METHOD FOR MAKING THE SAME
Sedgwick C. Rogers, Appleton, Wis., assignor to Kimberly-Clark Corporation, a corporation of Delaware
No Drawing. Filed Nov. 10, 1958, Ser. No. 772,687
4 Claims. (Cl. 154—45.9)

The present invention relates generally to the making of a composite product having a base of a ligno-cellulosic material such as plywood, which is provided on one or both surfaces thereof with a layer of a plastic cellulosic surfacing material, and has for its principal object the improvement of the surface characteristics of certain types of such products.

Large quantities of plywood are employed each year in the United States in the building trade, for furniture, for packaging boxes and other uses. A large proportion of this plywood is made from Douglas fir, because there is a large amount of suitable logs of this species available, from which veneer sheets can be cut by rotary cutting methods for use in the manufacture of plywood. The wood is relatively strong, easy to fabricate and free of defects.

Softwood plywoods such as Douglas fir plywood and other similar softwood plywoods, have two characteristic disadvantages which render such plywoods less acceptable than hardwood-surfaced plywoods for uses in which surface appearance of the plywood is a factor. One of the characteristics is the very pronounced grain effect, resulting from the fact that the springwood and the summerwood of Douglas fir have widely different densities and physical properties. The springwood grain areas of the surface are light, usually almost white, in color and are comparatively soft. The summerwood grain areas are tan to brown in color and the summerwood is dense and provides a hard surface. The grain appearance of the surface is highly irregular, and because of this irregularity and the high contrast between the springwood and summerwood the Douglas plywood panels are usually spoken of as having a "wild grain" surface. Now, not only is this grain effect highly undesirable in appearance, but the variation in the grain density produces appreciable dimensional changes across the grain of the rotary cut veneer as the moisture content is changed, and when the veneers are laminated into plywood, this manifests itself in the form of grain raising and checking in the face veneers, thus preventing the obtaining of smooth surfaces.

The second objectionable characteristic of Douglas fir plywood is the relative softness of the surface so that the plywood is quite susceptible to scuffing, marring and denting. While the dark summerwood grain is quite hard the light springwood grain areas are very soft and can be dented with very little pressure.

These problems have in recent years been partially solved by the application of resin-containing papers to the surface of plywood. The resin-containing papers are usually characterized by a high resin content and are commonly referred to as an "overlay." The use of high resin content plastic surfacing overlays provides a hard, dense surface for the plywood which is very resistant to wear and to marring and to denting. The overlay provides much better resistance to water for outdoor applications. The checking problem is also controlled by this method. The use of high density resin-impregnated overlay sheets does not however improve the "wild grain" surface appearance of the Douglas fir type plywood but in most cases accentuates the grain contrast between the light springwood and the dense dark summerwood, so that the surface appears to have a "wilder grain" than the unsurfaced plywood. This "wild grain" effect thus renders even resin-impregnated paper surfaced Douglas fir plywood unsuitable for many uses where surface appearance is a factor.

It is an object of the present invention to provide a resin-impregnated paper surfaced softwood plywood having a pleasing low contrast wood grained appearance.

It is a further object of the present invention to provide an improved Douglas fir plywood panel consisting of a Douglas fir plywood panel having a smooth, hard, durable surface, resistant to checking and with a low grain contrast and pleasing surface appearance.

Other objects will be apparent from the description which follows.

It has been found that the foregoing objects of the present invention may be attained by employing as a surfacing material for softwood plywoods of the Douglas fir type, overlays of resin-impregnated papers which have incorporated in the resin-impragnant a white pigment having a refractive index of at least about 2.00, in an amount of between about 0.25–5 percent of the weight of the resin solids. Titanium dioxide is a particularly suitable pigment. This pigmented resin-impregnated paper overlay is bonded to the surface of the plywood in the conventional manner and the resulting plywood panel has the advantages of a conventional plastic surfaced plywood sheet and in addition the contrast of the springwood grain and summerwood grain are so reduced, without being completely masked that a very pleasing low-contrast wood grain appearance is presented.

Previous efforts to improve the appearance of Douglas fir plywood have usually been based upon the complete masking of the grain surface. This may be done by the use of hardwood veneer but this method is quite expensive and thus not practical for most applications. Another such method is to use a very heavy resin-impregnated paper masking sheet but this also is expensive and does not produce an attractive wood grain appearance.

The medium or low density masking type resin-impregnated papers when attached to fir plywood completely mask the grain and thus destroy the attractiveness of a wood grain surface.

Where clear resin-impregnated high density paper overlays are used, the overlay is compressed to a greater degree over the hard dense summerwood grain than it is over the light low density soft springwood grain. The greater densification of the resin and overlay paper fibers make the portions of the overlay over the dark summerwood much more transparent than the overlay over the springwood thus increasing the contrast between the dark summerwood and the light springwood. The greater tendency of the low density springwood to absorb resin even further intensifies this effect. The result is an increase in the contrast between the grains, even when very heavy resin overlays are used. The addition of coloring material to the resin, such as dyes, lakes, etc., does not substantially reduce the high contrast between the two grain surfaces.

The employment of a paper overlay impregnated with a resin containing a white pigment which has a high refractive index, in accordance with the present invention results in a marked lightening of the color of the summerwood grain without appreciably affecting the color of the springwood areas of the surface, so that the contrast between the springwood and the summerwood is very markedly reduced. The resulting surface retains the wood grain appearance, but because of the low contrast the surface is very pleasing and attractive in appearance. Moreover this pleasing effect is attained without the necessity for any substantial increase in the cost of the resin-impregnated paper overlay.

The base paper for the resin-impregnated sheets may vary according to the pulp used in the furnish and the method of manufacturing. Kraft or sulfite pulp sheets or mixtures thereof are commonly used. Groundwood pulp, semi-chemical pulp, or cold caustic pulp may be incorporated with the chemical pulp or pulps in order to improve the formation of the sheets. Generally speaking, the base sheet which is to be impregnated should be a fairly heavy, moderately dense and moderately absorbent sheet. For surfacing Douglas fir panels, base sheets having a basis weight of from about 25 to 100 pounds per 3000 square feet and containing a substantial percentage of chemical pulp will be found most satisfactory. Such sheets having a caliper from about 3 to 10 mils, and preferably 4 to 6 mils, and a density in the range of from about 0.5 to about 0.8 gram per cubic centimeter can be readily impregnated by passage through a bath containing the impregnating resin to provide the desired resin content. Base paper having a basis weight of from about 35 to 60 pounds per 3000 square feet is preferred for most applications.

The resin employed to impregnate the attachment sheet should be selected from the general class of resins known as "laminating resins." Also the resin should be of the thermosetting type, which is to say that the resin should be one in which the curing reaction is irreversible in character and once the resin has hardened will not return to its original fluid state upon heating.

The most commonly used laminating resins for this purpose are the aldehyde resins such as the phenol aldehyde and resorcinol aldehyde resins. Water-soluble phenolic resins have been found to be particularly suitable. These include resins derived from mono-, and polyhydric phenols and their derivatives (cresols and cresylic acids and its derivatives) reacted with aldehyde and aldehyde yielding compounds, for example, formaldehyde (including formalin, paraformaldehyde, and hexamethylenetetramine) furfural, etc.

Generally it is desirable that the impregnating resin shall be a relatively low viscosity, high solids content resin. Resins having a viscosity within the range of from about 200 to 500 centipoises at a temperature of 75° F., and solids content within the range from about 60–72 percent by weight are suitable. The resins usually have a specific gravity within the range of about 1.10 to 1.30 and are normally supplied at a pH range of about 7.0–8.5

Where the resin impregnant of the overlay sheet is relied upon to establish the bond between the overlay and the plywood panel the resin employed should be one which will not become fully set during the impregnation and drying of the sheet or for a reasonable "shelf life" period thereafter, prior to the attachment operation. The ability of the resin-impregnant of the overlay sheet to act as a bonding agent under normal attachment conditions may be expressed in terms of its flow characteristics. In a common test for this characteristic a stack of sheets of resin-impregnated paper, each sheet 4 inches square, and the stack weighing a total of 32 grams, is heated for 7 minutes in a press at 150 pounds per square inch at a temperature of 145° C. The resin which has flowed from the impregnated paper sheets is then removed and the consolidated stack of sheets reweighed. The percentage loss in weight during this test is referred to as the percentage of flow. Thus a sample of impregnated paper tested by this method, which loses 5 percent in weight is spoken of as having a 5 percent flow. For the purpose of the present invention the resin-impregnated overlay sheet should retain a flow of at least about 2 percent during the impregnation, drying period and for a reasonable storage period thereafter, for example from 6 to 12 months. The setting characteristics of most phenol formaldehyde resins are suitable without modification. With other aldehyde laminating resins, however, it may be desirable to employ suitable polymerization inhibitors such as are known to the resin art.

The optimum resin contents when using base sheets of the type described above (i.e. moderately absorbent sheets having a basis weight within the range of from about 25 to 100 pounds per 3000 square feet, a caliper within the range of from about 3 to 10 mils and a density within the range from about 0.5 to 0.8 gram per cubic centimeter) is about 45 to 50 percent based on the weight of resin solids in a completely dry resin-impregnated sheet. Sheets, however, having a much greater range of percentage of resin solids in the sheet, for example sheets having resin contents of from 30 to 65 percent may be used. The base sheets may be impregnated with the resin in any conventional manner, for example by passing the paper through a bath of an aqueout solution of the resin and then through the nips of one or more roll pairs to adjust the resin content of the impregnated paper. While the paper is normally first manufactured and then impregnated with the resin in accordance with the method above described or similar methods, the resin may alternatively be incorporated into the beater of the papermaking machine and the resin-impregnated paper made in this manner.

In the case of paper impregnated by contacting the paper with a liquid solution or emulsion of the resin, following the impregnation, the paper may be passed through a drying operation. The purpose of the drying operation is to reduce the volatiles in the impregnated paper to the point where the paper can be readily handled, shipped and stored without the inconvenience that would accompany this handling of damp paper. In addition to these considerations, the volatile content of the sheet must be reduced to the point where moisture from the resin-impregnated sheet will not blister the overlay during the attachment of the overlay to the plywood panel. On the other hand, the drying operation can not be so drastic as to result in a substantial curing of the resin, in which case the resin would not serve the purpose of adhesively attaching the overlay to the plywood panel in the final operation. It is therefore desirable that the impregnated overlay sheet be dried to a volatile content of less than about 13 percent. It is also essential that this drying operation not reduce the flow of the resin in the impregnated paper to less than about 2 percent.

The pigment incorporated in the resin should be white and have a refractive index greater than about 2.00. The whiteness may be measured as dry brightness of the pigment by TAPPI (Technical Association of the Pulp and Paper Industry) Standard T646 m–54. A pigment having a brightness of at least about 95 percent is considered white for the purpose of the present invention. The pigment should be in a finely divided state and pigments having a particle size range of about 0.2–0.8 micron are preferred. White pigments which are most suitable include titanium dioxide, zinc sulfide, zinc oxide, zirconium oxide and lead titanate. Mixed pigments may be employed. The amount of pigment incorporated in the resin should be between about 0.25 percent and 5 percent of pigment solids based upon the weight of the resin solids. A pigment content of about 1 to 2 percent with typical phenolic resins yields very satisfactory results. Where a tinted or colored low contrast product is desired, dyes or coloring material may be added to the resin in addition to the high-refractive index white pigment to obtain the desired effect. The pigment may be mixed with the resin-impregnant in any convenient method. For example when the resin employed is in aqueous solution form it is convenient to use an aqueous dispersion of the pigment to mix with the resin solution. The presence of the pigment in the resin-impregnant has little or no effect on the impregnation of the paper and it may be carried out by conventional methods.

The pigmented resin-impregnated paper may be employed in the surfacing of plywood by any of the conventional methods. For example the layers of veneer which are to be incorporated into the plywood may be assembled into the position which they are to occupy in the completed panel with glue lines between each wood to wood surface. One or more of the plastic impregnated pigmented overlay sheets may then be placed on each of the outer surfaces of the assembly to form a layup unit which is placed between caul plates and the unit placed in a plywood press and subjected to the heat and pressure necessary to effect a uniform bond between all of the layers. When the resin-impregnated sheet contains one of the usual laminating resins such as the phenol-formaldehyde type, or the resorcinol-aldehyde type, consolidation of the board and overlay may be accomplished at a temperature of approximately 275–325° F., under a pressure of approximately 150–250 pounds per square inch for 10–20 minutes. It is to be understood that practical time-temperature relationships may be employed. Should other laminating resins be employed, the curing temperature, pressure and time may be adjusted to the particular resin involved. The above method is usually referred to as the "one-step" process of forming surfaced plywood panels.

Now while the pigmented impregnated sheet of the present invention may be employed advantageously in the surfacing of plywood sheets made by the one-step process the present surfacing sheets are particularly desirable when used in the manufacture of plywood by the "panel" process or "two-step" process. In the two-step process the plywood panel is first manufactured in accordance with conventional practice and the resultant panel then sanded and it may be graded. The sanded panel is then surfaced by forming a layup of the panel and one or more sheets of the plastic impregnated paper placed on one or both surfaces of the panel and then applying heat and pressure in a conventional plywood press to the resultant layup to bond the resin-impregnated paper and the panel into a composite whole. A surfaced panel made with plywood manufactured by the two-step process is usually less attractive than a surfaced panel made with plywood manufactured by the one-step process, because the surface tends to have a very high contrast with very sharply delineated grain areas. The reason for this is that with the sanded panel the smooth surface of the dense summerwood grain causes the overlay to become uniformly transparent in these areas thus resulting in a surface of very high contrast, whereas with the unsanded panel the summerwood grain surface is rougher, resulting in less uniform pressure during the molding operation and thus less sharply defined summerwood areas and a lower contrast surface. The pigmented overlay of the present invention is thus particularly useful in reducing the contrast of the grains in panels manufactured by the two-step process.

A single resin-impregnated sheet may be employed as the overlay. The overlay however is usually made up of two or more sheets. The basis weight of the overlay may vary with the effect desired but overlays having a basis weight in the range 60–630 pounds per 3000 square feet are employed. For many applications overlays having a basis weight in the range 150–270 pounds per 3000 square feet, and made up of two sheets of the pigmented resin-impregnated paper sheets are preferred.

As an illustration of the process of the present invention, a 60 pound (bone dry) basis weight sheet made from a furnish consisting of 100 percent unbleached kraft was impregnated with a water-soluble, phenol formaldehyde resin. The phenol formaldehyde resin was one having a solids content of 65 percent by weight, a specific gravity of 1.19 and a pH of 7.5. An aqueous dispersion of titanium dioxide had been mixed with the resin solution prior to the impregnation. The titanium dioxide had been prepared from rutile, had an average particle size of 0.4 micron, a tinting strength (Reynolds constant volume method) of 1550 and a specific gravity of 4.2. The Reynolds method is described in Physical Examination of Paints, Varnishes, Lacquers and Colors, Gardner and Sword, 10th ed., p. 45. The titanium dioxide content of the resin solution was 2.0 percent by weight of the resin solids. Following impregnation the sheet was dried to a moisture content of 8 percent. The resin content of the impregnated sheet was 35 percent solids based upon the weight of the dry impregnated sheet. Two of the resin-impregnated sheets were employed in each overlay and an overlay was applied to each side of a Douglas fir sanded plywood panel by placing a layup of resin-impregnated sheets - plywood panel - resin - impregnated sheets between caul plates and then placing the entire assembly in a plywood press and heating the entire assembly in the press at a pressure of 200 pounds per square inch, and a temperature of 280° F., for 15 minutes. The resulting panel had a wood grain appearance but the contrast between the springwood and summerwood grains was low and the appearance of the surface was pleasing. A similar Douglas fir plywood panel finished in identical manner with resin-impregnated sheets of identical weight but lacking the pigment, had a surface in which the natural wild grain of the Douglas fir panel was accentuated and thus had a very high contrast surface and generally unpleasing appearance.

As a second example, a base sheet, having a basis weight of 45 pounds per 3000 square feet and made from a furnish which consisted of 50 percent unbleached sulfite and 50 percent unbleached kraft was impregnated in accordance with the process of the present invention with a water-soluble phenol formaldehyde resin having a titanium dioxide content of 2.5 percent titanium dioxide based on the weight of the resin solids. The phenol-formaldehyde resin was the same as that employed in the preceding example. The titanium dioxide was incorporated into the resin as a 50 percent aqueous dispersion. The average particle size of the titanium dioxide was 0.3–0.4 micron, the refractive index was 2.7 and the tinting strength was 1600. The dry brightness of the pigment was 98 as determined by TAPPI Standard T646 m–54. The sheet was impregnated to a resin content of 50 percent of resin solids based upon the dry weight of the impregnated sheet. After suitable drying the sheets were used to surface Douglas fir plywood panels in the same manner as described in Example 1. Two of the impregnated sheets were used in each overlay and both sides of the panel were surfaced. Here again, as in the above example it was found that the resultant product had a pleasing appearance and that the grain contrast was greatly reduced.

Now that the process of the present invention has been generally described it is to be understood that it is capable of many modifications. Changes therefore may be made without departing from the spirit and scope of the invention as described in the appended claims in which it is the intention to claim all novelty inherent to the invention as broadly as possible, in view of the prior art.

What is claimed is:

1. The method of reducing contrast between light springwood and dark summerwood in softwood plywood while providing said plywood with a smooth hard surface, which comprises the steps of applying to at least one surface of said plywood a paper impregnated with a thermosetting aldehyde resin containing a highly refractive white pigment and curing the plywood-paper assembly from about 10 to 20 minutes at a temperature of about 275° to 325° F. while maintained under a pressure of 150 to 250 p.s.i. to produce a plywood panel having a plastic cellulosic surface with subdued wood grain appearance, the resin impregnant comprising about 30 to 65% by weight of the dry weight of the impregnated paper and the pigment in said resin comprising about 0.25 to 5% by weight of said resin and having a refractive index greater than 2.00.

2. The method of claim 1 in which the resin is phenol-formaldehyde and the white pigment is titanium dioxide.

3. A plastic-surfaced softwood plywood having reduced contrast between light springwood and dark summerwood which comprises a Douglas fir plywood panel and a thermoset plastic impregnated cellulosic overlay integrally attached to at least one surface of said panel and partially masking the wood grain thereof, said cellulosic overlay consisting of at least one sheet of paper having incorporated therein a thermoset aldehyde resin and a highly refractive white pigment, the resin comprising about 30 to 65% by weight of the dry weight of the impregnated paper, and the pigment comprising about 0.25 to 5% by weight of said resin and having a refractive index greater than 2.00 and a particle size of 0.2 to 0.8 microns.

4. The plastic-surfaced plywood of claim 3 in which thermosetting resin is phenol-formaldehyde and the refractive pigment is titanium dioxide.

References Cited in the file of this patent

UNITED STATES PATENTS

| | | |
|---|---|---|
| 852,938 | Emerson | May 7, 1907 |
| 1,997,358 | Cochrane | Apr. 9, 1935 |
| 2,345,942 | Lehman | Apr. 4, 1944 |
| 2,609,321 | Patterson | Sept. 2, 1952 |
| 2,631,960 | Dafter | Mar. 17, 1953 |
| 2,634,534 | Brown | Apr. 14, 1953 |
| 2,724,642 | Brown | Nov. 22, 1955 |
| 2,732,325 | Lindenfelser et al. | Jan. 24, 1956 |